United States Patent
Echols, Jr. et al.

(10) Patent No.: US 6,788,945 B1
(45) Date of Patent: Sep. 7, 2004

(54) METHOD AND APPARATUS TO DETERMINE MOBILE USER'S LOCATION IN A WIRELESS COMMUNICATION NETWORK

(75) Inventors: Billy G. Echols, Jr., Jackson, MS (US); Alan T. Paris, Brandon, MS (US)

(73) Assignee: WorldCom, Inc., Clinton, MS (US)

( * ) Notice: Subject to any disclaimer, the term of this patent is extended or adjusted under 35 U.S.C. 154(b) by 54 days.

(21) Appl. No.: 10/201,728

(22) Filed: Jul. 23, 2002

(51) Int. Cl.$^7$ ................................................ H04Q 7/20

(52) U.S. Cl. ............................... 455/456.5; 455/456.1; 455/456.2; 455/456.6

(58) Field of Search ............................. 455/404.2, 405, 455/414.2, 422.1, 440, 441, 456.1, 456.2, 456.3, 502; 342/351.16, 357.09, 458, 357.06, 357.01, 357.05; 370/510, 512, 328, 338, 337

(56) References Cited

U.S. PATENT DOCUMENTS

| | | | | |
|---|---|---|---|---|
| 5,365,516 A | * | 11/1994 | Jandrell | 370/335 |
| 6,031,489 A | * | 2/2000 | Wyrwas et al. | 342/357.16 |
| 6,125,125 A | * | 9/2000 | Narasimha et al. | 370/510 |
| 6,201,499 B1 | * | 3/2001 | Hawkes et al. | 342/387 |
| 6,201,973 B1 | * | 3/2001 | Kowaguchi | 455/456.6 |
| 6,329,948 B1 | * | 12/2001 | Ishikawa | 342/457 |
| 6,484,034 B1 | * | 11/2002 | Tsunehara et al. | 455/456.6 |

* cited by examiner

Primary Examiner—Jean Gelin

(57) ABSTRACT

A wireless communication system and method for determining a location of a mobile station communicating within the system. The system comprises a plurality of base receivers for receiving wireless communication, a controller, and at least one mobile station for transmitting a signal for receipt by at least two of the base receivers. The base receivers that received the transmitted signal determine a timing error associated with the transmitted signal, and the controller determines a separation distance between the mobile station and each base receiver that received the transmitted signal based at least upon the timing error. The controller further determines the location of the mobile station within the wireless communication network based upon the separation distance between the mobile station and the base receivers that received the transmitted signal.

26 Claims, 8 Drawing Sheets

METHOD AND APPARATUS TO DETERMINE MOBILE USER'S LOCATION IN A WIRELESS COMMUNICATION NETWORK

BACKGROUND OF THE INVENTION

1. Field of the Invention

This invention relates generally to wireless communication networks and, more particularly, to a method and apparatus for determining a mobile user's location within a wireless communication network.

2. Description of the Related Art

Wireless communication networks, such as radio communication networks, have become increasingly popular over the years due in part to the freedom of movement they provide to the communicating public. As a result of this popularity, wireless communication networks have rapidly expanded into several new coverage areas, thereby increasing the range of their wireless coverage to the mobile user.

Typically, it is desirable to determine the geographical location of a mobile user within a wireless communication network in such instances as a 911 emergency call, for example. In landline communication networks, the location of the user's communication equipment is stationary, and, thus, the location of the communication equipment may be easily determined by the telephone number of the user's equipment that is cross-referenced to a static location (i.e., an address). In wireless communication networks, however, the mobile user's location may change frequently, thereby making it much more difficult to ascertain the user's precise geographical location within the wireless network. Moreover, as these wireless communication networks expand their communication coverage, it becomes more difficult to determine a precise geographical location of a mobile user since there is a much larger area in which the mobile user may communicate.

The present invention is directed to overcoming, or at least reducing the effects of, one or more of the problems set forth above.

SUMMARY OF THE INVENTION

One aspect of the present invention is seen in a method for determining a location of a mobile station within a wireless communication network. The wireless communication network includes a plurality of base receivers coupled to a switch for receiving communication from the mobile station during a specified period of time. A signal is transmitted from the mobile station for receipt by at least two of the base receivers. A timing error, associated with the transmitted signal, is determined for each of the base receivers that received the transmitted signal. A determination is made of the separation distance between the mobile station and each base receiver that received the transmitted signal based at least upon the timing error, and a determination is made of the location of the mobile station within the wireless communication network based upon the separation distance between the mobile station and the base receivers that received the transmitted signal.

Another aspect of the present invention is seen in a wireless communication system for determining a location of a mobile station communicating therein. The system comprises a plurality of base receivers for receiving wireless communication, a controller, and at least one mobile station for transmitting a signal for receipt by at least two of the base receivers. The base receivers that received the transmitted signal determine a timing error associated with the transmitted signal, and the controller determines a separation distance between the mobile station and each base receiver that received the transmitted signal based at least upon the timing error. The controller further determines the location of the mobile station within the wireless communication network based upon the separation distance between the mobile station and the base receivers that received the transmitted signal.

BRIEF DESCRIPTION OF THE DRAWINGS

The invention may be understood by reference to the following description taken in conjunction with the accompanying drawings, in which like reference numerals identify like elements, and in which.

Figure 1:
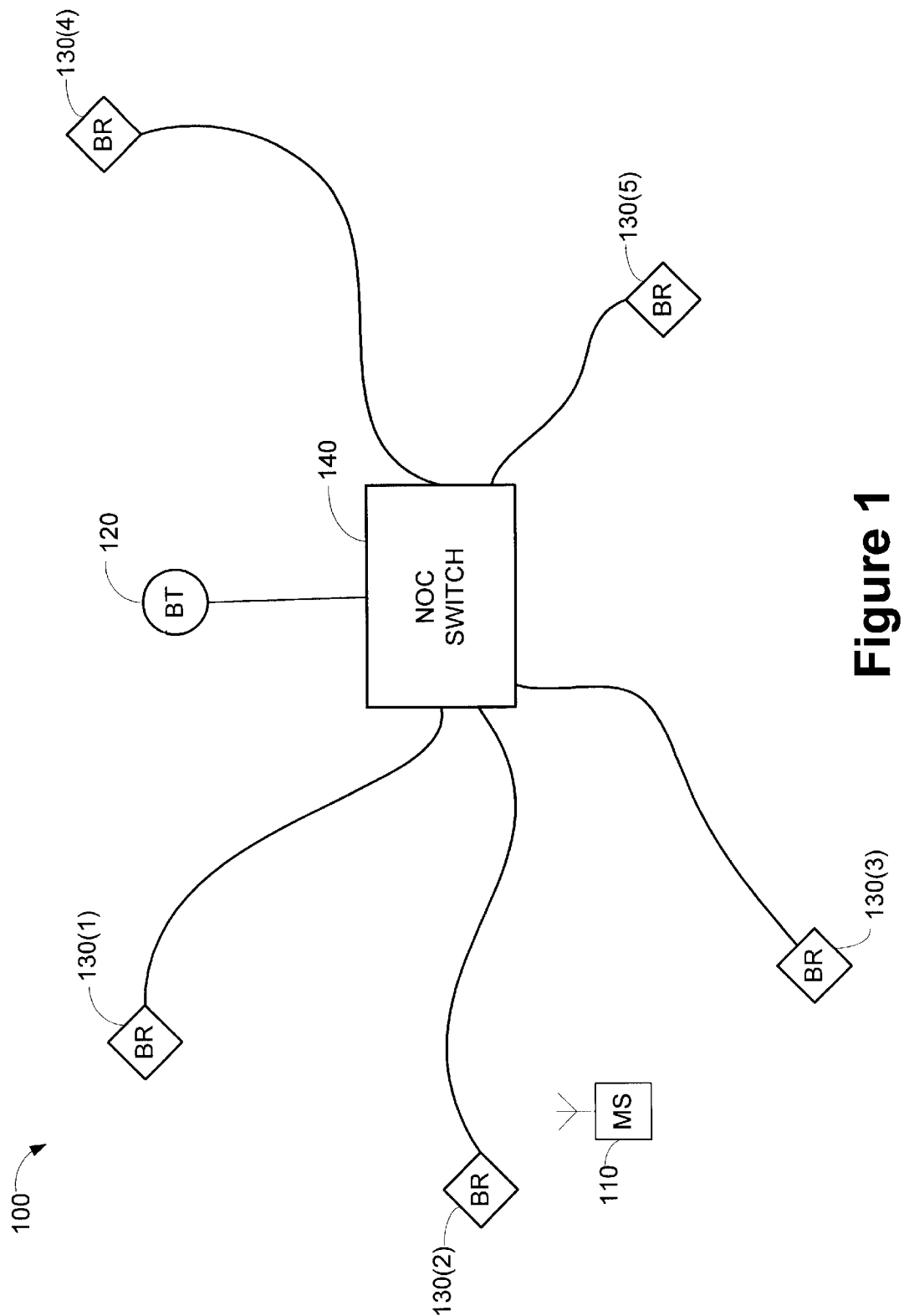
FIG. 1 shows a wireless communication network with a mobile station communicating therein according to one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a wireless communication network 100 is shown in accordance with one embodiment of the present invention.

In the illustrated embodiment, the wireless communication network 100 takes the form of a paging network providing full duplex messaging capabilities for a mobile subscriber communicating therein. It will be appreciated, however, that the wireless communication network 100 may alternatively take the form of a cellular radio network, a PCS network, or various other types of zoned radio communication networks that include voice and/or data messaging capabilities without departing from the spirit and scope of the present invention. It will further be appreciated that the communication network 100 need not necessarily be limited to radio communications, but may also employ a variety of other types of wireless communication protocols.

The wireless communication network 100 includes at least one mobile station (MS) 110 that receives wireless communication on a forward transmission path from at least one base transmitter (BT) 120. The mobile station 110 also transmits wireless communication in the form of messages over a reverse transmission path for reception by at least one of a plurality of base station receivers (BR) 130, which are deployed in various geographical locations throughout the network 100 to provide continuous communication coverage to the mobile station 110. In accordance with the illustrated embodiment, the wireless communication network 100 is a macrodiversity network where there are approximately 5 to 7 base receivers 130 deployed for every base transmitter 120. It will be appreciated, however, that the number of base receivers 130 associated with a particular base transmitter 120 may vary, and, thus, need not be limited to the aforementioned example.

The base transmitter 120 and the base receivers 130 are coupled to a network operation center (NOC) switch 140, which switches connections between the mobile station 110 and the various base receivers 130 as the mobile station 110 traverses the wireless communication network 100. The NOC switch 140 also can switch connections between the mobile station 110 and various base transmitters 120 provided that more than one base transmitter 120 is deployed within the wireless communication network 100. The switching of the mobile station 110 to the various base transmitters 120 and receivers 130 may be accomplished via conventional handoff techniques as is well established in the art. It will be appreciated that the base transmitters 120 may use the same frequency and transmit the same data (i.e., the communication network 100 may take the form of a simulcast system) or may use a range of frequencies to transmit data. The NOC switch 140 also may maintain a connection with other NOC switches (not shown) within the network 100 that may be handling wireless communication for another mobile station (not shown) that is in communication with the mobile station 110. It will further be appreciated that the NOC switch 140 also may be coupled to a public switched telephone network (PSTN) (not shown) to permit communication between the mobile station 110 and a communicating party via a landline telephone network.

In accordance with the illustrated embodiment, the wireless communication network 100 is a synchronous system, which enables the mobile station 110 to transmit and receive at specific times and for specific lengths (i.e., periods) of time in "time slots" that are assigned to the mobile station 110 by the NOC switch 140. The timing for transmission and reception of messages to and from the mobile station 110 is controlled in each base transmitter 120 and base receiver 130 of the network 100 through a global positioning system (GPS) timing standard, for example, as is well established in the art. The mobile station 110 determines the timing maintained at the base transmitter 120 by decoding synchronization patterns that are transmitted periodically by the base transmitter 120. The specific manner in which the mobile station 110 decodes these transmitted synchronization patterns is well known to those of ordinary skill in the art, and will not be discussed herein to avoid obscuring unnecessarily the present invention. The mobile station 110 also generates and transmits a synchronization pattern in its assigned time slot on the reverse transmission path for transmission to the base receiver 130 along with message data. The synchronization pattern is part of the transmitted signal's header and is specific to the protocol selected in the mobile station 110. The other portions of the signal's header include bits to uniquely identify the mobile station 110.

A timing error may occur naturally in the mobile station's transmission of messages because of the physical separation distance between the base transmitter 120 and the mobile station 110 at a given point in time within the wireless communication network 100. That is, the greater the separation distance between the mobile station 110 and the base transmitter 120, the greater the error in the mobile station's timing, thereby increasing the likelihood the mobile station 110 will not transmit at the precise time that it is instructed to do so by the transmitter 120. The amount of error in the mobile station's timing is approximately 5.36815 microseconds-per-mile times the distance the mobile station 110 is separated physically from the base transmitter 120. Thus, a mobile station 110 that is located approximately five miles from the base transmitter 120 will have a timing error of approximately 26.84 microseconds. Accordingly, the greater the separation distance between the mobile station 110 and the base transmitter 120, the more problematic the timing error at the mobile station 110 will become.

Because the wireless communication network 100 is configured as a macrodiversity system in the illustrated embodiment, more than one of the base station receivers 130 typically will receive the same transmitted message from the mobile station 110, which is often referred to as a "shared" message. In accordance with the illustrated embodiment, the base station receivers 110 are geographically dispersed within the wireless communication network 100 such that at least three base station receivers 130 typically will receive the same shared message transmission from the mobile station 110. It will be appreciated, however, that the wireless communication network 100 may be configured to have more or fewer base station receivers 130 concentrated within a particular area of the network 100 to increase or decrease, respectively, the number of shared messages that are received by the mobile station 110.

Each base receiver 130 of the wireless communication network 100 is configured to know when to expect to receive inbound traffic from the mobile station 110 on the reverse transmission path by knowing where the mobile station's respective time slot begins (which, as previously discussed, is assigned to the mobile station 110 by the NOC switch 140). Of course, several of these time slots allocated to the mobile station 110 may remain empty when the mobile station 110 is not actively transmitting. Because the wireless communication network 100 is synchronous, any incoming traffic to the base station receiver 130 by the mobile station 110 may be detected from previously specified synchronization bits that the mobile station 110 sends in its header, as previously discussed. According to one embodiment of the present invention, each of the base receivers 130 that receives an incoming message that was transmitted from the mobile station 110 will calculate the difference in time between the actual arrival of the signal that was transmitted by the mobile station 110 and the time when the signal should have been received.

Referring again to FIG. 1, for example, the mobile station 110 is shown located most proximate to the base receiver 130(2). When the mobile station 110 transmits a message on its reverse transmission path, the message may be received as a shared message at each of the base receivers 130(2), 130(1), and 130(3). Typically, the discrepancy in time (i.e., time error) between the receipt of a message by base receiver 130(2) and the time that the message should have been received is less than the discrepancy in time of the message observed by base receivers 130(1) and 103(3) because of the physical proximity of the mobile station 110 to the base receiver 130(2). Accordingly, in the example shown in FIG. 1, the base receiver 130(2) should calculate the smallest time error in receiving the shared message from mobile station 110, the base receiver 130(3) should calculate the next smallest time error, and the base receiver 130(1) should calculate the largest time error in receiving the shared message from the mobile station 110 because it is the furthest distance from the mobile station 110 that received the shared message.

Figure 2:
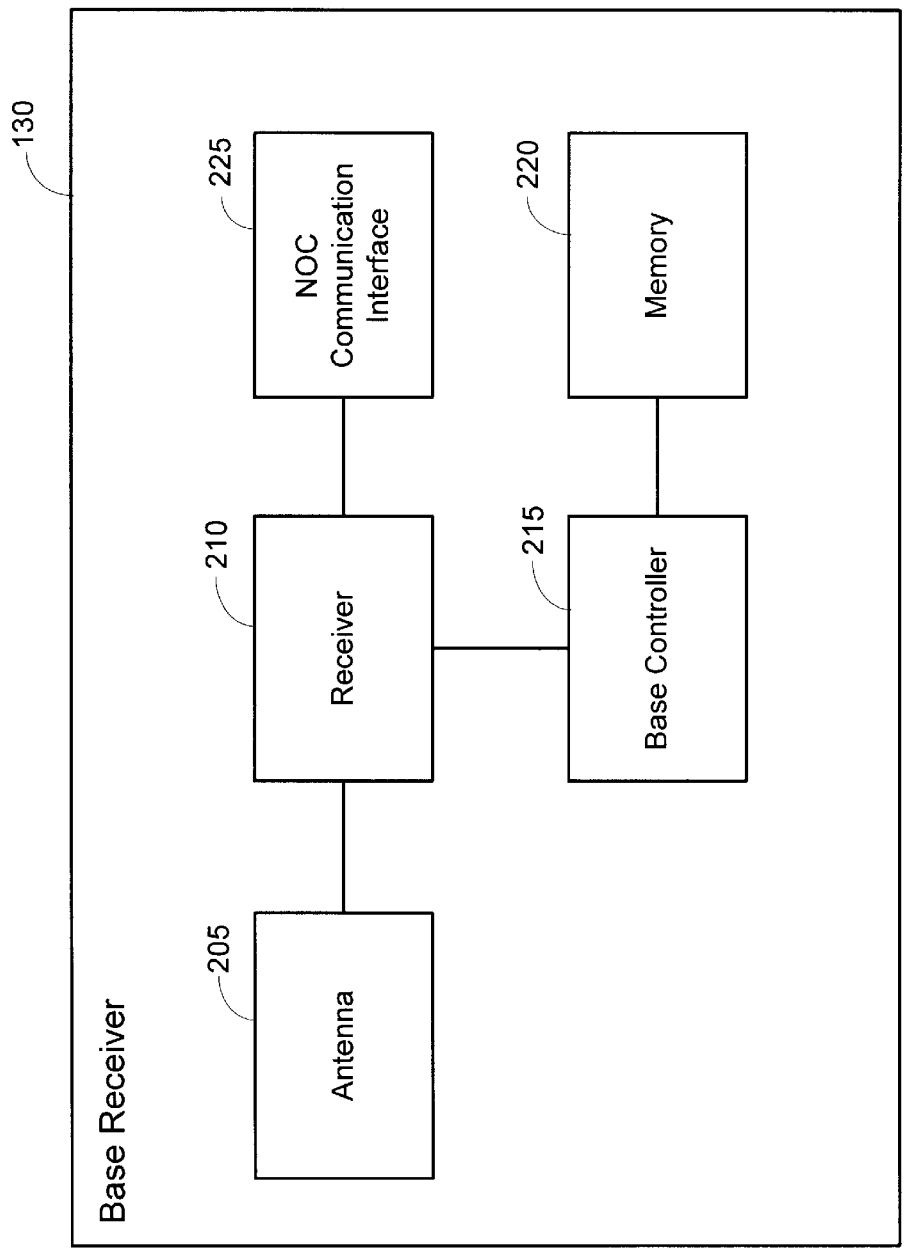
FIG. 2 illustrates a block diagram of a base station receiver of the wireless communication network of FIG. 1.

Turning now to FIG. 2, a more detailed representation of the base receiver 130 is shown in accordance with one embodiment of the present invention. Although the base receiver 130 provided in FIG. 2 is shown in one of its simplest forms for ease in illustrating the present invention, it will be appreciated that the base receiver 130 may include several other components either in addition to or in lieu of those components illustrated without departing from the spirit and scope of the present invention.

The base receiver 130 includes an antenna 205 for receiving communication from the mobile station 110 via a wireless communication protocol, which, in accordance with the illustrated embodiment, takes the form of a radio frequency (RF) communication medium. A receiver 210 receives the communication transmitted from the mobile station 110 and forwards the received communication to an NOC communication interface 225, which communicatively couples the base receiver 130 to the NOC switch 140. The base receiver 130 is further configured with a base controller 215, which controls the operation of the base receiver 130 and its internal components. In particular, the base controller 215, upon receipt of a message from the mobile station 110, will calculate the time difference (i.e., timing error) between the actual receipt of the message transmitted by the mobile station 110 by the base receiver 130 and when the message should have been received by the base receiver 130 (i.e., in accordance with the timing standard as set forth by the base transmitter 120).

The base receiver 130 further includes a memory 220 to store instruction sets, which execute on the base controller 215 for controlling the operation of the base receiver 130. In particular, the memory 220 has stored therein a program for enabling the base controller 215 to determine the timing error of the mobile station 110 between the actual receipt of the mobile station's transmitted messages and when these messages should have been received by the mobile station 110. The memory 220 also may store a variety of other information, such as the timing error calculated by the base controller 215 for the mobile station. 110. When the base controller 215 determines the timing error of the mobile station 110, the controller 215 forwards the calculated timing error along with the message content (i.e., payload) and the mobile station 110's identifier received from the mobile station 110 to the NOC switch 140 via the NOC communication interface 225.

In accordance with one embodiment of the present invention, the difference in time (i.e., timing error) between the receipt of the mobile station's message by the base receiver 130 and when the message should have been received is accomplished via a synchronous pattern matching technique performed by the base controller 215, which identifies the mobile station's transmitted synchronous pattern on the reverse transmission path and the actual time of receipt of this synchronous pattern.

According to one embodiment, the wireless communication network 100 of FIG. 1 takes the form of a simulcast data messaging network that uses a ReFlex® 2.7 communication protocol. The synchronous patterns generated via this protocol for both the forward and reverse transmission paths to and from, respectively, the mobile station 110 are precisely defined. According to one embodiment, each 9,600 bits-per-second (bps) four-level frequency-shift keying (FSK) ReFlex® 2.7 reverse path slot from the mobile station 110 to the base receiver 130 is 16.0417 milliseconds in duration. The NOC switch 140 informs the mobile station 110 via the forward path of the reverse path slot in which to insert its message for transmission to the base receiver 130. The protocol breaks the first reverse path slot used into three sections: a 26-bit section for ramp-up time that is 2.7 milliseconds in duration, a 24-bit section for synchronous bits that is 2.5 milliseconds in duration, and a 104-bit section for message data that is 10.8417 milliseconds in duration.

The earliest incoming messages are received by the base receiver 130 from the mobile station 110 is when the mobile station 110 is located in the same geographical area as a collocated base receiver 130 and base transmitter 120. The first reverse path slot, which is defined as B0, of each 1.875-second ReFlex® frame occurs precisely at the end of the forward path synchronous pattern radiated from the base transmitter 120. This synchronous pattern ends 115 milliseconds after the beginning of each 1.875-second frame. The frames are transmitted at thirty-two frames per minute beginning at the top of the minute. A cycle is defined as 128 frames (i.e., four minutes in duration) with each frame numbered sequentially in ascending order beginning with zero. An hour is divided into fifteen cycles numbered zero through fourteen, or 1920 frames per hour. Therefore, the earliest time a reverse synchronous pattern is detectable by the base receiver 130 in the B0 reverse path slot from the mobile station 110 is 120.2 milliseconds, which is the sum of 115 milliseconds (i.e., the end of the forward synchronous pattern transmitted from the base transmitter 120) plus the 2.7 milliseconds and 2.5 milliseconds (i.e., the end of the ramp-up and synchronous bits sections of the reverse path transmitted by the mobile station 110). The difference in time (or timing error) between the 120.2 milliseconds when the mobile station's synchronous pattern should have been detectable by the base receiver 130 and the actual beginning of the synchronous pattern that is detected by the base receiver 130 is the distance of the mobile station 110 to the base receiver 130 times 5.36815 microseconds-per-mile. The base controller 215 of the base receiver 130 is able to determine this timing error between the time the mobile station's synchronous pattern should have been received at the base receiver 130 and when the synchronous pattern was actually received at the base receiver 130 via a synchronous pattern matching technique performed by the base controller 215.

Figure 3:
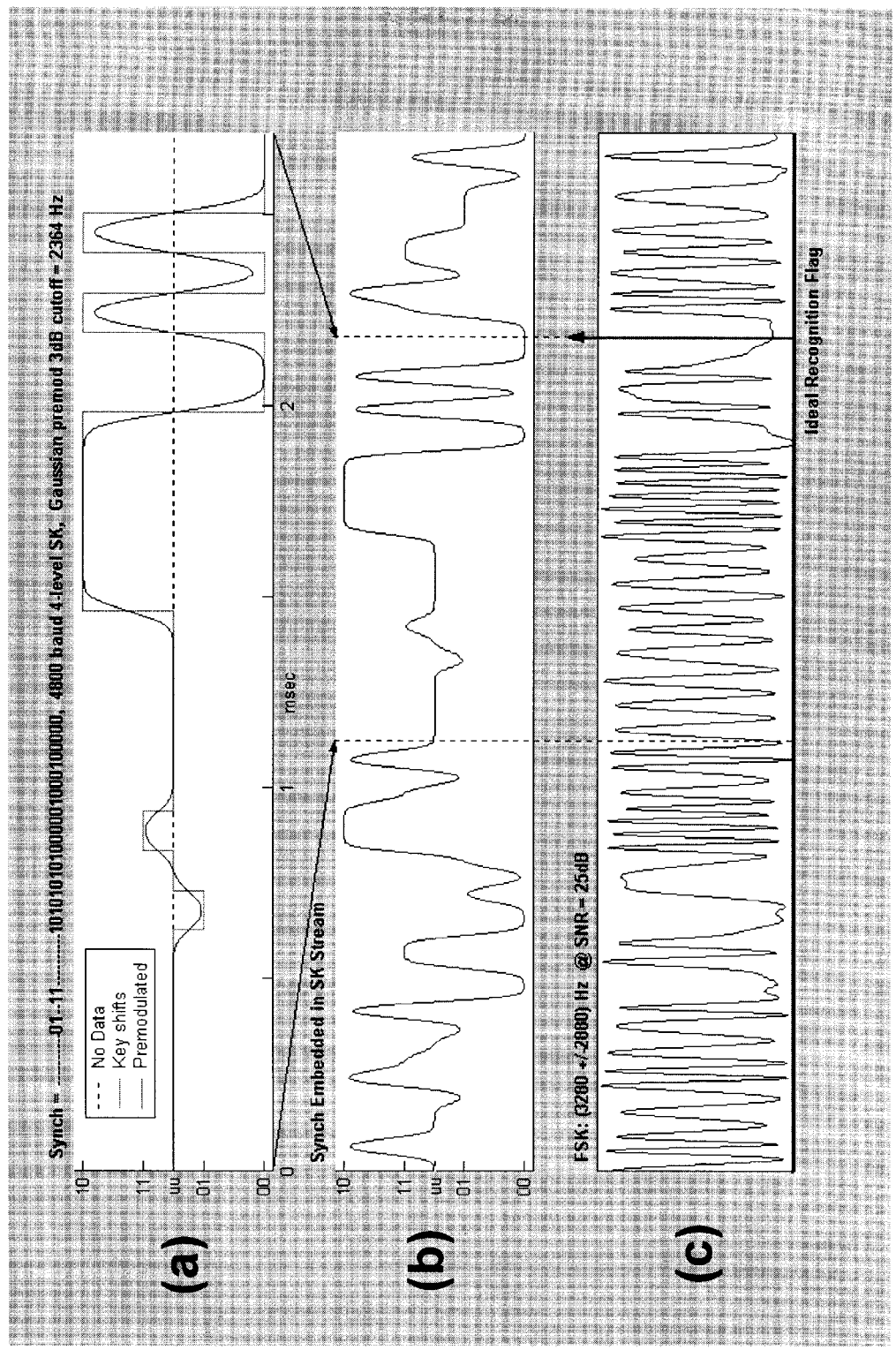
FIGS. 3a–c show a synchronization pattern signal that is generated by the mobile station of the wireless communication network.

Turning now to FIG. 3a, a typical synchronization bit pattern that may be generated by the mobile station 110 and transmitted to the base receiver 130, which is converted into the four-level frequency shift-key (4FSK) form, is shown. FCC regulations require the passage of the raw shift-key signal through a pre-modulation filter (e.g. a non-causal Gaussian filter) in order to reduce cross talk among varying frequency bands. FIG. 3b illustrates the synchronization bit pattern generated by the mobile station 110 of FIG. 3a that is embedded in a frequency shift-key RF stream with varying data shifts. FIG. 3c shows the resulting pre-modulated frequency shift-key (FSK) stream modulating a carrier frequency with the addition of band-limited noise.

In accordance with the illustrated embodiment of the present invention, the base controller 215 is configured to pattern match a synchronous bit pattern that is transmitted by the mobile station 110 to a predetermined bit pattern. When the synchronous bit pattern transmitted by the mobile station 110 is identified via the signal pattern matching technique, the actual time of receipt of the transmitted synchronous bit pattern is then known by the base controller 215, and the timing error of the mobile station 110 is ascertained by the base controller 215 by determining the difference in time between the actual receipt of the identified synchronous signal transmitted by the mobile station 110 and the time that the synchronous signal should have been received by the base receiver 130 in the mobile station's assigned time slot.

The base controller 215 may accomplish the pattern matching of the transmitted synchronous signal by the mobile station 110 by utilizing pre-computed filter coefficients which were previously calculated to match a pre-defined pattern. The pre-computed filter coefficients may be continuously convolved with the sampled transmitted synchronous signal by well-known methods until a pre-defined recognition pulse is output by the convolution. The time of the pulse's output is the time at which the pattern was recognized. The special pre-computed filter coefficients may be stored in the memory 220 of the base receiver 130 and retrieved by the base controller 215 for execution thereon.

An example of program code that may be executed ahead of time by the base controller 215 to compute the special filter coefficients required to generate a pre-defined recognition pulse when a single pre-defined pattern is recognized is provided in Appendix A of this application. It will be appreciated by those of ordinary skill in the art that the specific program code provided in Appendix A may be modified to match various other signal generated patterns, and, thus, need not necessarily be limited to matching synchronous pattern signals generated in a wireless communication network as disclosed herein.

Figure 4:
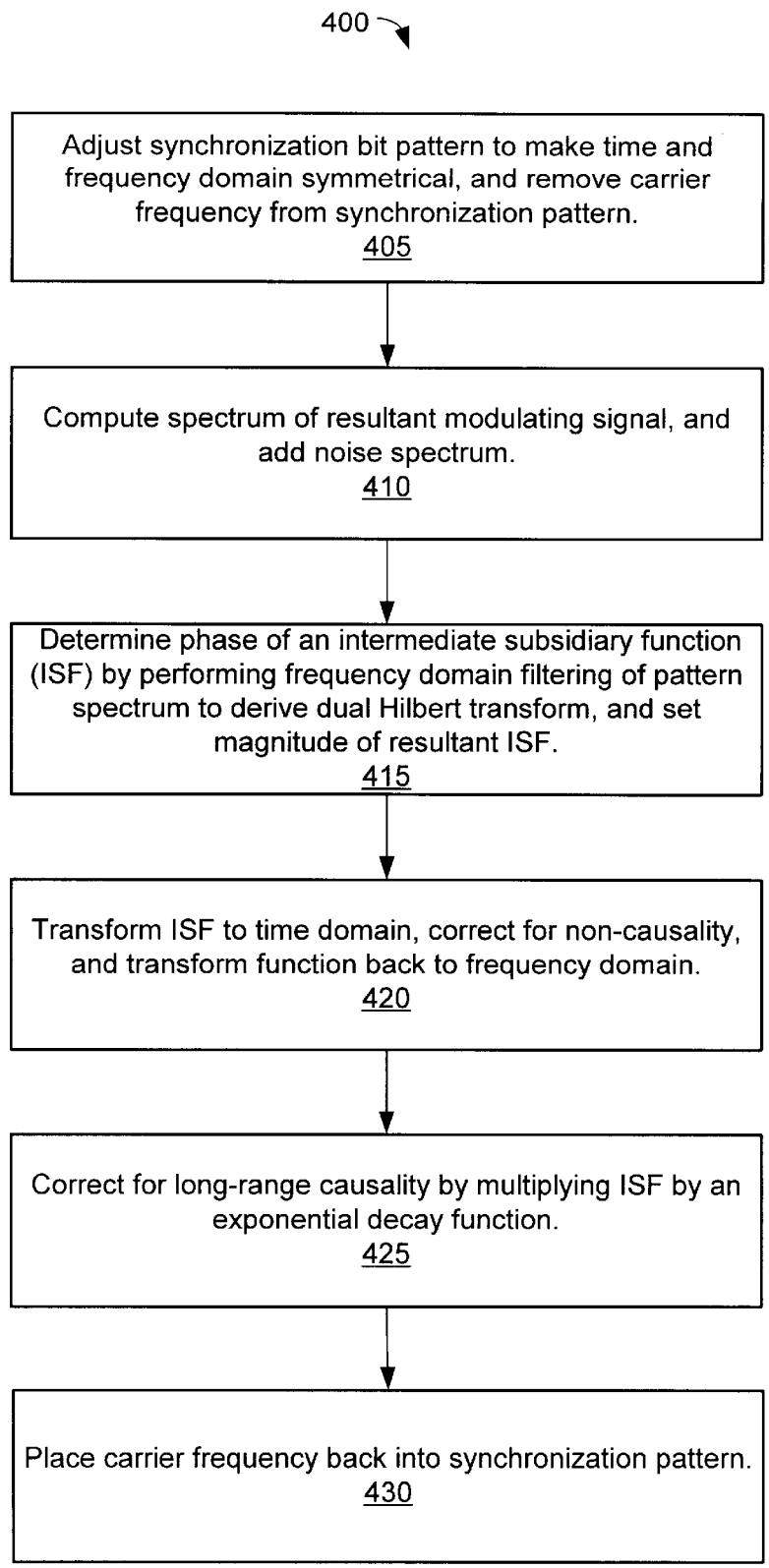
FIG. 4 illustrates a process of synchronization pattern matching that is performed by the base station receiver of FIG. 2.

Turning now to FIG. 4, a process 400 for determining the pre-computed filter coefficients is shown according to one embodiment of the present invention. The process 400 commences at block 405, where the base controller 215 adjusts the synchronization bit pattern to make the time domain and frequency domain symmetrical, and the carrier frequency is removed from the synchronization pattern, thus providing a resultant modulating pattern. At block 410, the base controller 215 computes the spectrum of the resultant modulating pattern using a Fast Fourier Transform (FFT), and adds a noise spectrum to the pattern spectrum. The base controller 215 then determines the phase of an intermediate subsidiary function (ISF), by performing frequency domain filtering of the pattern spectrum to derive a dual Hilbert transform, and sets the magnitude of the resultant determined intermediate subsidiary function at block 415.

The process 400 continues at block 420, where the base controller 215 corrects for non-causality due to the possible presence of numerical inaccuracies. In one embodiment, the base controller 215 initially transforms the intermediate subsidiary function to the time domain, corrects for the non-causality, and then transforms the intermediate subsidiary function back to the frequency domain.

At block 425, the base controller 215 corrects for any long range causality by multiplying the intermediate subsidiary function by an exponential decay function and determines the pattern filter coefficients as the unique causal solution of an equation using the intermediate subsidiary function and the pattern spectrum. The base controller 215 then places the carrier frequency back into the synchronization pattern filter coefficients at block 430. It will be appreciated that the process 400 for calculating the pre-computed filter coefficients need not necessarily be performed by the base controller 215, but may alternatively be performed by a PC or mainframe computer in lieu thereof without departing from the spirit and scope of the present invention.

When the base controller 215 detects the synchronization bit pattern transmitted by the mobile station 110, a signal recognition flag is generated by the base controller 215, which indicates the successful recognition of the mobile station's transmitted synchronous pattern. As previously mentioned, the base controller 215 may accomplish the pattern matching of the transmitted synchronous signal by utilizing the pre-computed filter coefficients which were previously calculated by process 400 of FIG. 4 to match a pre-defined pattern. The pre-computed filter coefficients may then be continuously convolved with the sampled transmitted synchronous signal by well-known methods until a pre-defined recognition pulse is output by the convolution at which point the base controller 215 generates the signal recognition flag. The base controller 215 determines the difference in time between the actual time that the signal recognition flag was generated to the time that the synchronous pattern should have been received by the base receiver 130. This difference in time determined by the base controller 215 is then forwarded to the NOC switch 140.

Figure 5:
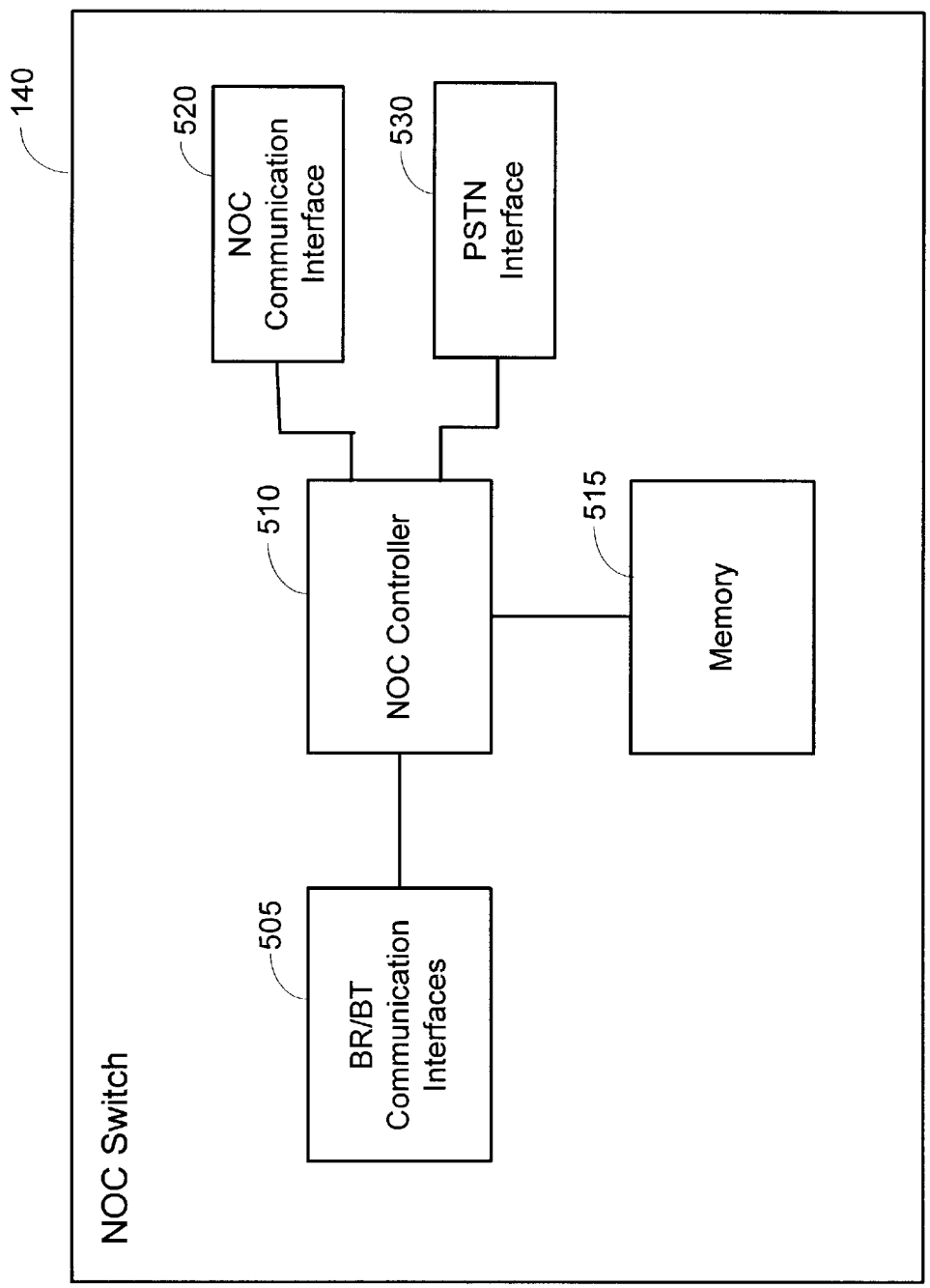
FIG. 5 is a block diagram of a network operation controller (NOC) switch of the wireless communication network of FIG. 1.

Turning now to FIG. 5, a more detailed representation of the NOC switch 140 is shown according to one embodiment of the present invention. The NOC switch 140 includes base receiver and base transmitter communication interfaces 505 for communicatively coupling the NOC switch 140 to those base receivers 130 and base transmitters 120 of the wireless communication network 100 that are associated therewith. The NOC switch 140 is further configured with a NOC controller 510, which controls the entire operation of the NOC switch's internal components. In particular, the controller 510 is adapted to switch communication connections between the base receivers 130, and, if desired, may also provide communication connections between the base receivers 130 and other NOC switches within the wireless network 100 via NOC communication interfaces 520. The NOC controller 510 may also provide a communication connection between the base receivers 130 and the public switched telephone network (PSTN), if so desired, via a PSTN interface 530. The NOC controller 510 receives its instructions through instruction sets that are stored in a memory 515.

In accordance with one embodiment of the present invention, the NOC controller 510 receives the shared messages that were received by each of the base receivers 130 and the timing error that was calculated by each base receiver 130 that received the shared message. Upon receipt of these shared messages from the base receivers 130, the NOC controller 510 determines the number of base receivers 130 that have forwarded the same shared message that was received from the mobile station 110. The NOC controller 510 then extracts the timing error calculated from each of the base receivers 130 that forwarded the same shared message, and calculates the difference in time between the timing errors for each combination of the base receivers 130 that forwarded the same shared message to the NOC switch 140.

In the example provided in FIG. 1, if the base receivers 130(1), 130(2), and 130(3) received the same shared message from the mobile station 110, then the NOC controller 510 will calculate the difference in the timing errors reported between the base receivers 130(1) and 130(2), the difference in the timing errors reported by the base receivers 130(1) and 130(3), and the difference in the timing errors reported by the base receivers 130(2) and 130(3). It will be appreciated that the number of combinations of the base receivers 130 for determining the difference in the reported timing errors depends on the number of base receivers 130 that have received the shared message from the mobile station 110. Accordingly, if there are four base receivers 130 that received the same shared message from the mobile station 110, then there are a total of six combinations between the base receivers 130, and the NOC controller 510 will calculate the difference in the reported timing errors for each of the six combinations of base receivers 130 that have received the same shared message from the mobile station 110.

After determining the difference in the reported timing errors for each combination of base receivers 130, the NOC controller 510 averages this difference in the timing errors between each combination of the base receivers 130. That is, the NOC controller 510 adds the differences in the timing errors between each combination of base receivers 130, and divides the result by the number of base receivers 130 that reported the shared message.

After averaging the difference in the timing errors for each combination of base receivers 130, the NOC controller 510 then subtracts the averaged value from each of the timing errors that were reported from each base receiver 130 that received the shared message. The NOC controller 510 then determines the distance between the mobile station 110 and each base receiver 130 that received the shared message by dividing each of the differences between the timing errors and the averaged values by 5.36815 microseconds per mile, which will provide the number of miles that the mobile station 110 is located from each base receiver 130.

Figure 6:
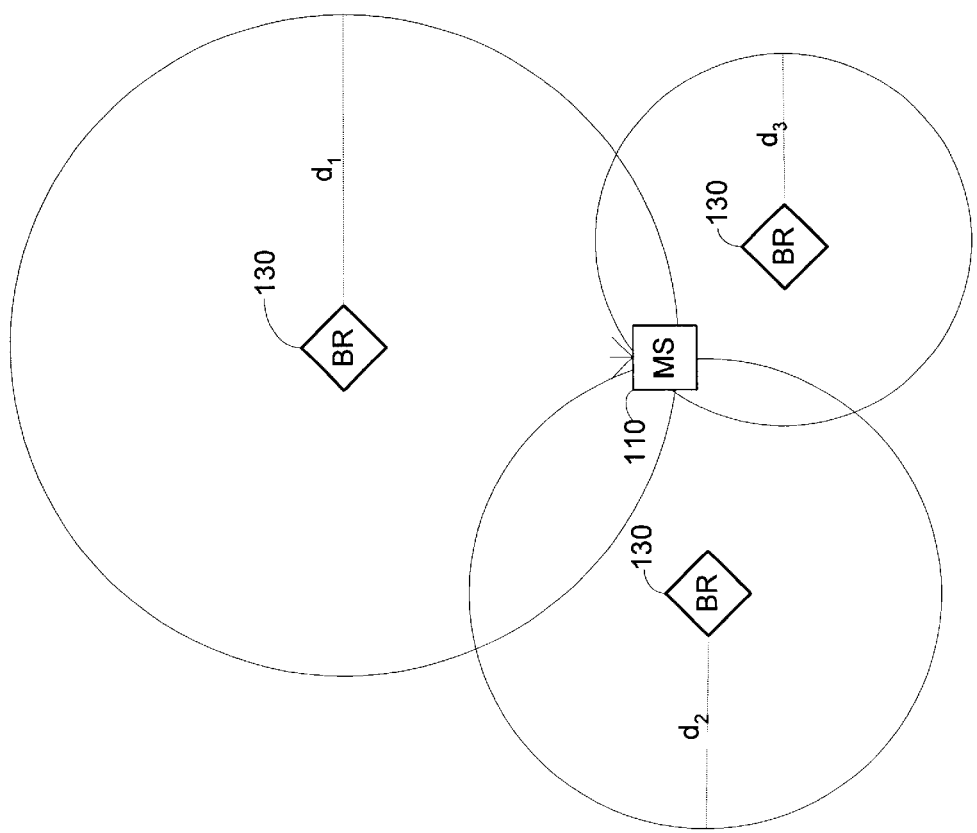
FIG. 6 illustrates plotted geographical regions around the base station receivers to determine the location of the mobile station within the wireless communication network.

Even though the distance of the mobile station 110 from each base receiver 130 (that received the shared message) has been determined, it is not known specifically in which direction relative to each base receiver 130 in which the mobile station 110 resides. Accordingly, referring to FIG. 6, the NOC controller 510 is further configured to plot a circle around each of the base receivers 130 that received the shared message, where the radius of the circle plotted around each of the "shared message" base receivers 130 is equivalent to the distance of the mobile station 110 from each respective base receiver 130 that received the shared message. The intersection of all the circles plotted around each respective base receiver 130 that received the shared message indicates to the NOC controller 510 the location of the mobile station 110 within the wireless network 100. In accordance with one embodiment, the NOC switch 140 may further be provided with a display (not shown) for displaying the plotted circles around the "shared message" base receivers 130 such that a network operator may visually inspect the location of the mobile station 110 within the wireless network 100, if so desired. In accordance with another embodiment, mapping data may be stored within the memory 515 of the NOC switch 140 such that the geographical coordinates of the mobile station's location within the wireless communication network 100 may be determined by the NOC controller 510.

Figure 7A:
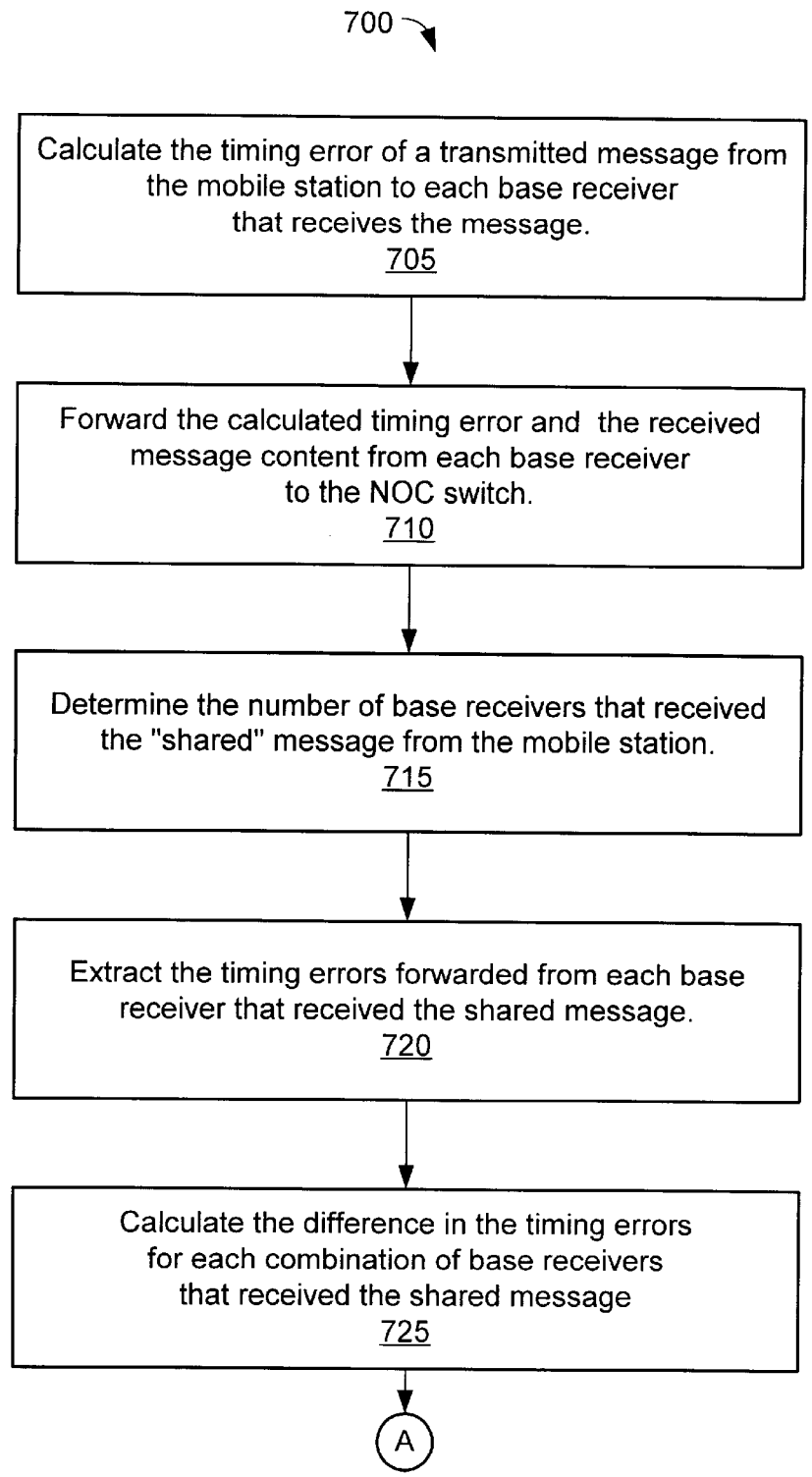
FIGS. 7a and b illustrate a process for determining a location of a mobile station in the wireless communication network of FIG. 1 according to one embodiment of the present invention.
Figure 7B:
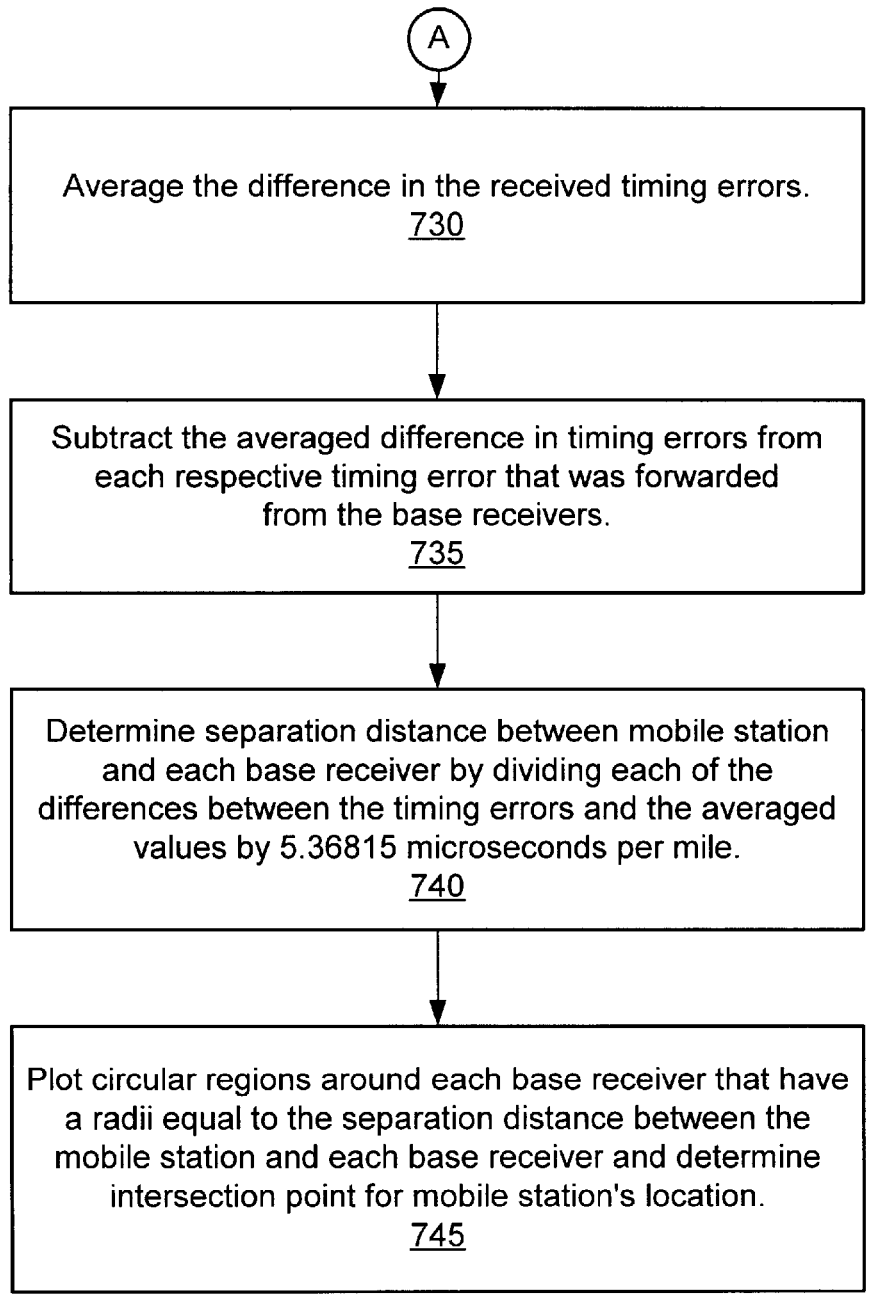

Turning now to FIGS. 7a and b, a process 700 is shown for determining the location of the mobile station 110 within the wireless network 100 in accordance with one embodiment of the present invention. The process 700 commences at block 705, where the base controllers 215 of the base receivers 130 (which receive a message transmitted from the mobile station 110 on a reverse transmission path) calculate the time difference (i.e., timing error) between the time that the message was actually received by each respective base receiver 130 and the time that the message should have been received by each respective base receiver 130 in the mobile station's assigned time slot. In accordance with one embodiment, the base controller 215 employs a pattern matching technique, as provided in the process of FIG. 4, for detecting the mobile station's synchronous pattern that is transmitted via the reverse transmission path. After determining the timing error at block 705, the base receivers 130 that received the shared message forward the calculated timing error along with the received message content to the NOC switch 140 at block 710.

After receiving the timing errors that were forwarded from each base receiver 130 that received the shared message, the NOC controller 510 determines the number of base receivers 130 that have reported the same message content (i.e., shared messages) at block 715. The process 700 proceeds next to block 720, where the NOC controller 510 subsequently extracts the timing errors forwarded from each base receiver 130 that received the shared message from the mobile station 110. After extracting the timing errors that were forwarded from the "shared message" base receivers 130, the NOC controller 510 calculates the difference in the timing errors for each combination of base receivers 130 reporting the same shared message at block 725.

At block 730, the NOC controller 510 then averages the difference in the received timing errors that were obtained in block 725. In accordance with the illustrated embodiment, the NOC controller 510 sums the differences of the timing errors between each combination of the "shared message" base receivers 130 and divides the resultant sum by the number of base receivers 130 that received the shared message (as determined in block 715). The process 700 continues at block 735, where the NOC controller 510 subtracts the averaged difference in timing errors (as determined at block 730) from each of the respective timing errors that were forwarded from the "shared message" base receivers 130. The NOC controller 510 then subsequently divides each value obtained in block 735 by 5.36815 microseconds per mile, at block 740, to determine the separation distance between the mobile station 110 and each of the base receivers 130 that received the shared message therefrom. At block 745, the NOC controller 510, upon determining the distance of the mobile station 110 from each base receiver 130 that received the shared message, plots a circle around each of the base receivers 130 that received the shared message, where the radius of the circle plotted around each of the "shared message" base receivers 130 is equivalent to the determined distance of the mobile station 110 from each respective "shared message" base receiver 130. The NOC controller 510 then determines the location of the mobile station 110 in the wireless communication network 100 by locating the intersection of all the circles plotted around each respective "shared message" base receiver 130. In accordance with one embodiment, the NOC controller 510 may obtain geographical coordinates from mapping data that is stored within the memory 515 to provide the geographical location of the mobile station 110 within the wireless communication network 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

What is claimed:

1. A method for determining a location of a mobile station within a wireless communication network, the wireless communication network including a plurality of base receivers coupled to a switch for receiving communication from the mobile station during a specified period of time, the method comprising:

transmitting a signal from the mobile station for receipt by at least two of the base receivers;

determining a timing error associated with the transmitted signal for each of the base receivers that received the transmitted signal;

determining a separation distance between the mobile station and each base receiver that received the transmitted signal based at least upon the timing error; and determining the location of the mobile station within the wireless communication network based upon the separation distance between the mobile station and the base receivers that received the transmitted signal, wherein determining the location of the mobile station, further comprises:

determining a circular region around a location of each base receiver that received the transmitted signal, each circular region having a radius equal to the separation distance between the mobile station and the respective base receiver; and determining an intersection point of the circular regions, thereby providing the location of the mobile station in the wireless communication network.

2. The method of claim 1, wherein determining a timing error further comprises:

determining a difference in time that the mobile station transmitted the signal and the specified time period that the mobile station should have transmitted the signal.

3. The method of claim 1, further comprising:

forwarding the determined timing error and message content that was received in the transmitted signal from each base receiver that received the transmitted signal to the switch.

4. The method of claim 1, further comprising:

determining the number of base receivers that received the transmitted signal from the mobile station.

5. The method of claim 1, further comprising:

calculating the difference in the timing errors forwarded by each base receiver for each combination of base receivers that received the transmitted signal.

6. The method of claim 1, wherein determining a timing error further comprises:

determining a plurality of filter coefficients to match the signal transmitted by the mobile station to a predefined synchronous bit pattern;

continuously convolving the plurality of determined filter coefficients with the signal transmitted by the mobile station until a predefined recognition pulse is output by the convolution; and determining a difference in time that the predefined recognition pulse is output and the specified time period that the mobile station should have transmitted the signal.

7. The method of claim 6, wherein determining a plurality of filter coefficients to match the signal transmitted by the mobile station to a predefined synchronous bit pattern further comprises:

removing a carrier frequency from the signal transmitted by the mobile station, thereby providing a resultant modulating signal;

computing a spectrum of the resultant modulating signal;

performing frequency domain filtering of the spectrum to derive a dual Hilbert transform, thereby determining a phase of an intermediate subsidiary function;

setting a magnitude of the intermediate subsidiary function;

correcting for non-causality and long-range causality of the intermediate subsidiary function; and placing the removed carrier frequency back into the signal transmitted by the mobile station.

8. A method for determining a location of a mobile station within a wireless communication network, the wireless communication network including a plurality of base receivers coupled to a switch for receiving communication from the mobile station during a specified period of time, the method comprising:

transmitting a signal from the mobile station for receipt by at least two of the base receivers;

determining a timing error associated with the transmitted signal for each of the base receivers that received the transmitted signal;

determining a separation distance between the mobile station and each base receiver that received the transmitted signal based at least upon the timing error; and determining the location of the mobile station within the wireless communication network based upon the separation distance between the mobile station and the base receivers that received the transmitted signal, wherein the determining the separation distance comprises:

calculating a difference in the timing errors forwarded by each base receiver for each combination of base receivers that received the transmitted signal, and averaging the calculated difference in the timing errors forwarded by each base receiver for each combination of base receivers that received the transmitted signal.

9. The method of claim 8, further comprising:

subtracting the averaged difference in the timing errors forwarded by each base receiver for each combination of base receivers that received the transmitted signal.

10. The method of claim 9, wherein determining a separation distance, further comprises:

determining a separation distance between the mobile station and each base receiver that received the transmitted signal by dividing the subtracted averaged difference by a factor.

11. The method of claim 10, wherein determining the location of the mobile station, further comprises:

plotting a circular region around a location of each base receiver that received the transmitted signal, each circular region having a radius equal to the separation distance between the mobile station and the respective base receiver; and determining an intersection point of the plotted circular regions, thereby providing the location of the mobile station in the wireless communication network.

12. A wireless communication system for determining a location of a mobile station communicating therein, comprising:
a plurality of base receivers configured to receive wireless communication;
a controller; and
a mobile station configured to transmit a signal for receipt by at least two of the base receivers, wherein:
the base receivers configured to receive the transmitted signal are further configured to determine a timing error associated with the transmitted signal, and the controller is configured to determine a separation distance between the mobile station and each base receiver that received the transmitted signal based at least upon the timing error, and is further configured to determine the location of the mobile station within the wireless communication network based upon the separation distance between the mobile station and the base receivers that received the transmitted signal, and
the controller is further configured to determine a circular region around a location of each base receiver that received the transmitted signal, each circular region having a radius equal to the separation distance between the mobile station and the respective base receiver, and is configured to determine an intersection point of the circular regions, thereby providing the location of the mobile station in the wireless communication network.

13. The wireless communication system of claim 12, wherein the timing error is a difference in time between the mobile station transmitting the signal and a specified time period at which the mobile station should have transmitted the signal.

14. The wireless communication system of claim 12, wherein the base receivers that are configured to receive the transmitted signal are further configured to forward the determined timing error and message content received in the transmitted signal to the controller.

15. The wireless communication system of claim 12, wherein the controller is further configured to determine a number of base receivers that received the transmitted signal from the mobile station.

16. The wireless communication system of claim 12, wherein the controller is further configured to calculate a difference in the timing errors forwarded by each base receiver for each combination of base receivers that received the transmitted signal.

17. The wireless communication system of claim 12, wherein the controller is further configured to determine a plurality of filter coefficients to match the signal transmitted by the mobile station to a predefined synchronous bit pattern, to continuously convolve the plurality of determined filter coefficients with the signal transmitted by the mobile station until a predefined recognition pulse is output by the convolution, and to determine a difference in time that the predefined recognition pulse is output and the specified time period that the mobile station should have transmitted the signal.

18. The wireless communication system of claim 17, wherein the controller is further configured to:
remove a carrier frequency from the signal transmitted by the mobile station, thereby providing a resultant modulating signal;
compute a spectrum of the resultant modulating signal;
perform frequency domain filtering of the spectrum to derive a dual Hilbert transform, thereby determining a phase of an intermediate subsidiary function;
set a magnitude of the intermediate subsidiary function;
correct for non-causality and long-range causality of the intermediate subsidiary function; and
place the removed carrier frequency back into the signal transmitted by the mobile station.

19. A wireless communication system for determining a location of a mobile station communicating therein, comprising:
a plurality of base receivers for receiving wireless communication;
a controller; and
a mobile station configured to transmit a signal for receipt by at least two of the base receivers, wherein:
the base receivers are configured to receive the transmitted signal and to determine a timing error associated with the transmitted signal, and the controller is configured to determine a separation distance between the mobile station and each base receiver that received the transmitted signal based at least upon the timing error, and is further configured to determine the location of the mobile station within the wireless communication network based upon the separation distance between the mobile station and the base receivers that received the transmitted signal,
the controller is configured to calculate a difference in the timing errors forwarded by each base receiver for each combination of base receivers that received the transmitted signal, and
the controller is further configured to average the calculated difference in the timing errors forwarded by each base receiver for each combination of base receivers that received the transmitted signal.

20. The wireless communication system of claim 19, wherein the controller is configured to subtract the averaged difference in the timing errors forwarded by each base receiver for each combination of base receivers that received the transmitted signal.

21. The wireless communication system of claim 20, wherein the controller is further configured to determine the separation distance between the mobile station and each base receiver that received the transmitted signal by dividing the subtracted averaged difference by a factor.

22. The wireless communication system of claim 21, wherein the controller is further configured to plot a circular region around a location of each base receiver that received the transmitted signal, each circular region having a radius equal to the separation distance between the mobile station and the respective base receiver, and is further configured to determine an intersection point of the plotted circular regions, thereby providing the location of the mobile station in the wireless communication network.

23. A method for determining a location of a mobile station within a wireless communication network, the wireless communication network including a plurality of base receivers coupled to a switch for receiving communication from the mobile station during a specified period of time, the method comprising:
transmitting a signal from the mobile station for receipt by a subset of the plurality of base receivers;
determining a timing error associated with the transmitted signal for each of the subset of base receivers that received the transmitted signal; and determining the location of the mobile station within the wireless communication network as a function of the timing error, wherein determining a timing error further comprises:

determining a plurality of filter coefficients to match the signal transmitted by the mobile station to a predefined synchronous bit pattern, continuously convolving the plurality of determined filter coefficients with the signal transmitted by the mobile station until a predefined recognition pulse is output by the convolution, and determining a difference in time that the predefined recognition pulse is output and the specified time period that the mobile station should have transmitted the signal.

24. The method of claim 23, wherein determining a timing error further comprises:

determining a difference in time that the mobile station transmitted the signal and the specified time period that the mobile station should have transmitted the signal.

25. The method of claim 23, further comprising:

determining a separation distance between the mobile station and each base receiver that received the transmitted signal based at least upon the timing error; and wherein determining the location of the mobile station further comprises determining the location of the mobile station within the wireless communication network based upon the separation distance between the mobile station and the base receivers that received the transmitted signal.

26. The method of claim 23, wherein determining a plurality of filter coefficients to match the signal transmitted by the mobile station to a predefined synchronous bit pattern further comprises:

removing a carrier frequency from the signal transmitted by the mobile station, thereby providing a resultant modulating signal;

computing a spectrum of the resultant modulating signal;

performing frequency domain filtering of the spectrum to derive a dual Hilbert transform, thereby determining a phase of an intermediate subsidiary function;

setting a magnitude of the intermediate subsidiary function;

correcting for non-causality and long-range causality of the intermediate subsidiary function; and placing the removed carrier frequency back into the signal transmitted by the mobile station.

* * * * *